INVENTOR.
BUFORD F. McMILLAN II
BY
Drummond & Cahill
ATTORNEYS

INVENTOR.
BUFORD F. McMILLAN II 3,420,551
HITCHING SYSTEM
Buford F. McMillan II, 16 E. Broadway,
Phoenix, Ariz. 85040
Filed Apr. 10, 1967, Ser. No. 629,554
U.S. Cl. 280—509          4 Claims
Int. Cl. B60d 1/02

ABSTRACT OF THE DISCLOSURE

A hitch bar is automatically coupled to a coupler and is pivoted into a towing position. The hitch bar is locked in the towing position until a hitch release mechanism is tripped. The coupler is locked in the coupled position until a coupler latch is tripped. A trigger member includes a coupler trigger and a hitch trigger for sequentially tripping the hitch latch and the coupler latch.

Background of the invention

This invention relates to hitching systems, and more specifically, to a hitching system wherein a towed vehicle may automatically be coupled to a towing vehicle and wherein the decoupling is accompanied by a selective and sequential triggering of the mechanism.

Hitching systems have been proposed wherein a hitch, formed of a bar shaped to resemble a sled runner is pivotally attached to a vehicle to be towed. In one generally upright position the hitch acts as a stand for the tongue of the towed vehicle; however, when the vehicle is being towed, the hitch pivots to a generally horizontal position to thereby provide ground clearance and also provide a means for attachment to the towing vehicle. Hitching systems have also been proposed wherein a hitch as previously described is combined with a coupler provided with a generally V-shaped opening mounted on the towing vehicle. The coupler provides a means wherein the towing vehicle may back towards the vehicle to be towed until the V-shaped slot in the coupler engages the hitch bar. An automatic latching means then couples the coupler and the hitch to permit the towing vehicle to move forwardly to cause the hitch to pivot to its horizontal towing position.

The prior art hitching systems have taken a variety of forms and have generally recognized the necessity of locking the hitching bar in its horizontal or towing position to prevent the bar from dragging or contacting the ground when force is no longer applied by the towing vehicle. Similarly, to permit the towing and towed vehicles to become uncoupled, it has generally been recognized that a remote uncoupling means is advantageous. However, not-withstanding the teachings of the prior art, it is presently necessary for a towing vehicle such as a tractor to approach the device to be towed such as a trailer, position itself, back into engagement to permit the coupler to couple, and then wait until an operator connects or couples a latch releasing mechanism mounted on the trailer to permit the hitch to be locked or unlocked from the towing vehicle. Further, the triggering or unlatching means utilized by the prior art has generally been unwieldy and frequently presents safety hazards by virtue of protruding arms, cables, and the like which give rise to inadvertent unlatching or tripping of the mechanism.

It is therefore an object of the present invention to provide a hitching system wherein protruding triggering or latching levers are eliminated.

It is another object of the present invention to provide a hitching system wherein the triggering mechanism for both the hitch and the coupler may be mounted on the towing vehicle thereby eliminating the necessity for the operator to dismount and connect triggering devices to the towing vehicle after an automatic coupling is effectuated.

It is still another object of the present invention to provide a hitching system wherein a single triggering mechanism is provided with a sequential triggering action to thereby permit, without the operator leaving the towing vehicle, the towed vehicle to be parked resting on the hitch as a stand or parked and completely decoupled.

These and other advantages of the present invention will become apparent to those skilled in the art as the description thereof proceeds.

Summary of the invention

Briefly, in accordance with the preferred embodiment of the present invention, a hitch bar is pivotally attachable to a vehicle to be towed and is positionable in a generally upright position for parking the towed vehicle or in a generally horizontal position for towing the towed vehicle. A hitch latching means for locking the hitch bar in the towing or horiztontal position is provided and is tripped by a hitch latch release mounted for pivotable movement with the hitch bar.

A coupler is provided and is attachable to a towing vehicle; the coupler includes a latch plate that automatically engages the hitch bar on the towed vehicle when the latter is engaged. The coupler latch plate is locked in place and is released by a coupler latch release member. A trigger is mounted on the towing vehicle, and in the embodiment chosen for illustration is preferentially mounted on the coupler attached to the towing vehicle, and includes two extensions each comprising a trigger for triggering the hitch latch or the coupler latch. When the trigger member is actuated, the hitch latch is tripped to permit the hitch bar to pivot to its generally upright or parking position. Further actuation of the trigger causes the actuation of the coupler release member thereby decoupling the coupler from the hitch bar.

Brief description of the drawings

The present invention may more readily be described by reference to the accompanying drawings in which.

Description of the preferred embodiment

Figure 1:
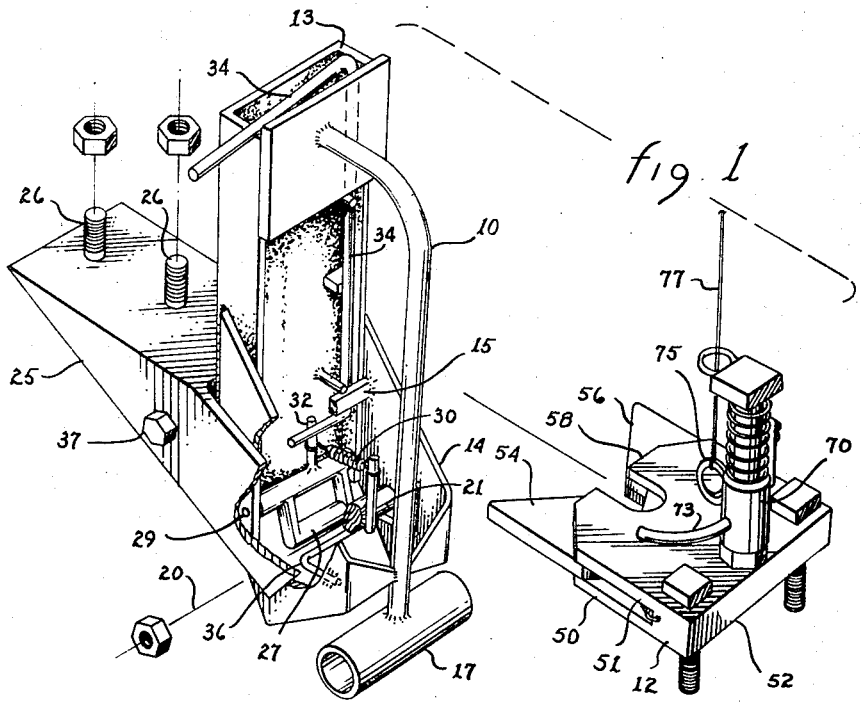
FIG. 1 is a perspective view partly in section and partly exploded illustrating a hitching system constructed in accordance with the teachings of the present invention.
Figure 5:
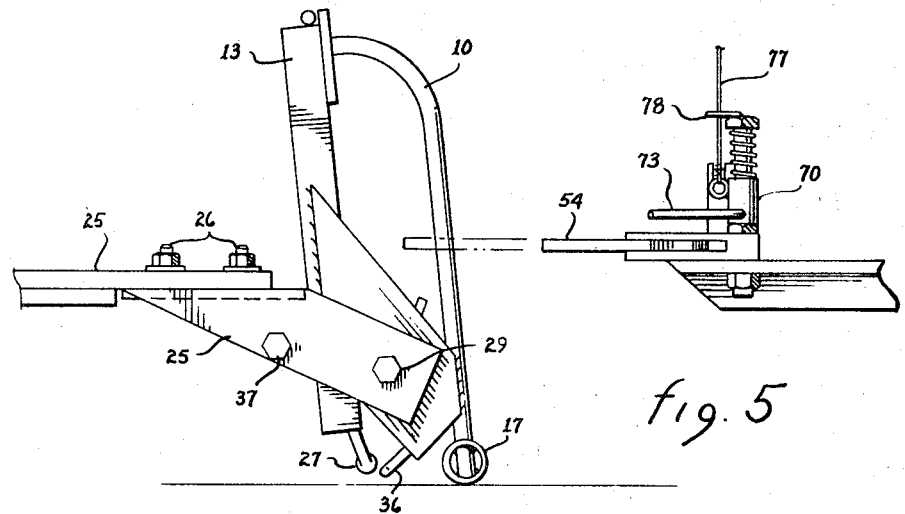
FIG. 5 is a side elevational view of the hitching system of the present invention illustrating the parked and coupled position of the hitching system.
Figure 6:
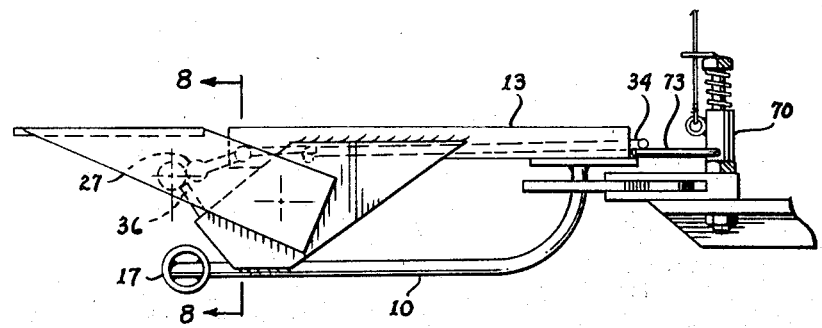
FIG. 6 is a side elevational view illustrating the coupled and towing position of the hitching system of the present invention.
Figure 7:
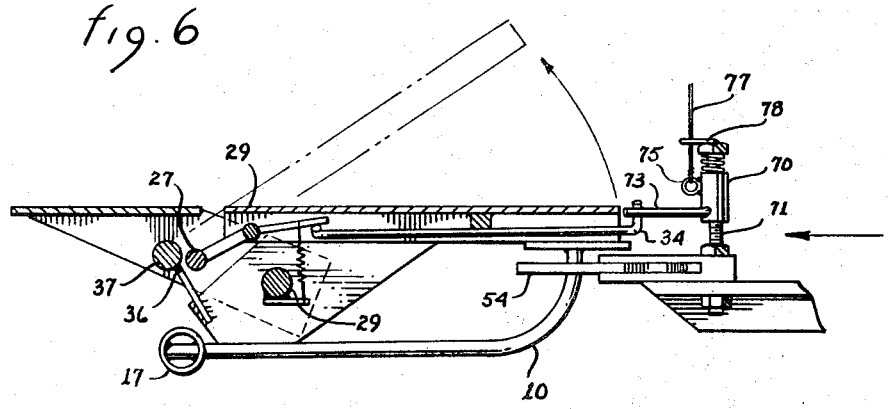
FIG. 7 is a side elevational view of a hitching system constructed in accordance with the teachings of the present invention showing the first sequence of triggering the mechanism.
Figure 8:
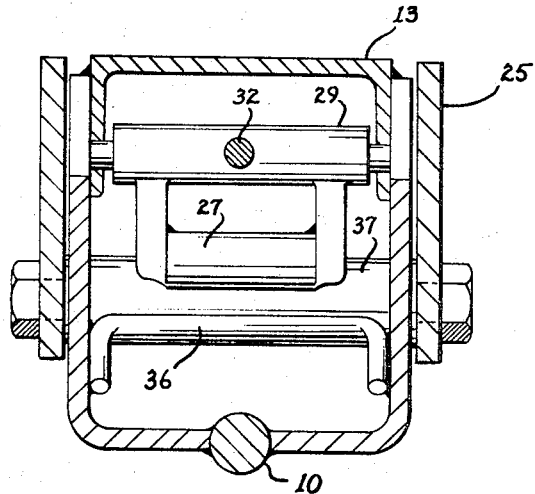
FIG. 8 is a cross sectional view of FIG. 6 taken along line 8—8.

Referring now to the drawings it may be seen that the present hitching system may be decoupled in two principal parts, a hitch bar 10 and a coupler 12. The hitch bar is formed of a tubular member and is shaped generally in a manner of a sled runner. The bar is welded to a framework made generally of channel members 13 and 14 and strengthening members such as transverse bar 15. The bar 10 terminates at its lower end in a tubular member 17 which acts as a coaster or stand member to increase the area of the hitch when it is in its parked position and contacting the ground. The hitch bar 10 is pivotal about an axis 20 defined by a pivot pin 21 extending through the sides of a tongue channel 25. The tongue channel is shaped to fit over the tongue of common towed vehicles such as farm implements and trailers. The tongue channel may be secured by means of bolts 26 passing through a towed vehicle tongue (not shown). The hitch bar has two basic positions: first, a generally upright position such as shown in FIGURES 1 and 5 wherein the tubular member 17 rests on the ground and supports the tongue of the towed vehicle above the ground; the second position is a generally horizontal position such as that shown in FIGURES 6 and 7 wherein the hitch bar is locked in position to permit the towed vehicle to be pulled by the towing vehicle. The locking mechanism includes a hitch latch 27 mounted for pivotal movement about a hitch latch pin 29. The hitch latch 27 is urged in a clockwise direction as viewed in the drawings through the expediency of a biasing spring 30 forcing radially extending member 32 against a hitch latch release 34. When the hitch bar is in its generally upright position, the pivotal movement of the hitch bar is limited by the contact of the channel member 13 with the tongue channel 25. When the hitch bar is swung downwardly to its generally horizontal position, clockwise movement as viewed in the drawings is limited by the engagement of a hitch stop 36 with a hitch locking pin 37. The hitch latch 27 also abuts the hitch locking pin 37 preventing counterclockwise movement as viewed in the drawings.

Figure 3:
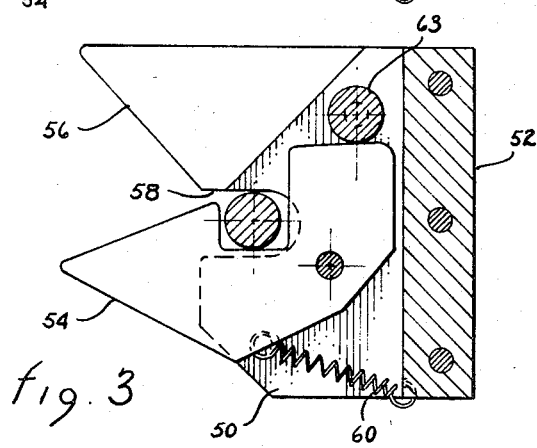
FIG. 3 is a top view of the coupler of FIG. 2 with the top plate removed and with the coupler latch plate in its towing position.

Thus, when the hitch bar has been pivoted to its horizontal position, its horizontal position is insured by the engagement of the hitch latch 27 and hitch stop 36 with the hitch locking pin 37. The coupler 12 is attachable to the towing vehicle and comprises plates 50 and 51 separated by a spacer 52 thus forming a "sandwich" to permit a coupler latch plate 54 to pivotally move therebetween about a pivot pin 55. A coupler plate 56 is also provided and includes a guiding edge similar to the coupler latch plate to form a V the apex of which comprises a hitch notch 58. The coupler latch plate 54 is spring biased to rotate in a counterclockwise direction as viewed in the drawings by a biasing spring 60. When a hitch bar is inserted into the notch 58, the bar will engage a camming surface 62 of the coupler latch plate causing the latter to pivot in a clockwise direction against the biasing force of the spring 60. The coupler latch plate will subsequently be latched in position by the latch and release member 63. The latch and release member is also spring biased into its latching position to thus latch the coupler latch plate in the position shown in FIGURE 3 and permit the coupler to couple the hitch bar 10. The decoupling of the hitch bar 10 is accomplished by lifting the latch and release member 63 against the force of the biasing spring to cause the member to rise out of the way of the pivotal movement of the coupler latch plate 54.

The trigger member 70 is provided and, in the embodiment chosen for illustration, comprises a sleeve slidably mounted over a shaft 71 and spring biased to the "untriggered" or lowermost position as shown in the drawings. The trigger member 70 includes a coupler trigger 72 and a hitch trigger 73. The coupler trigger 72 extends through a slotted opening 75 provided in the top of the latch and release member 63. The hitch trigger 73 is positioned in close proximity to the hitch latch release 34 when the hitch bar is in its towing or horizontal position. An actuating ring 75 is secured to the sleeve 70 and permits the attachment of a tripping cord 77 thereto; a guide ring 78 is secured to the top of the pin 71.

Figure 9:
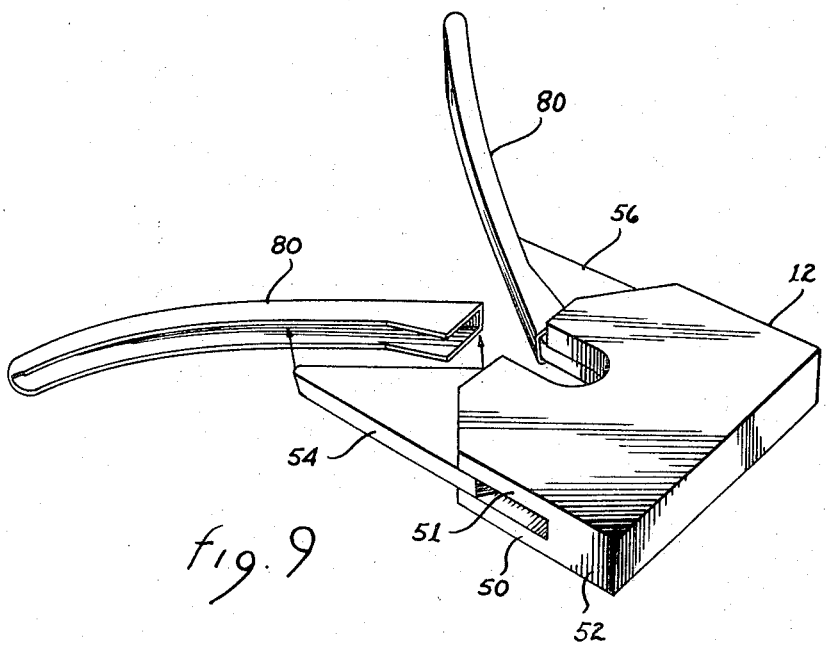
FIG. 9 illustrates another embodiment of the system of the present invention.

The operation of the hitching system of the present invention may now be described. Assuming the hitch bar and attached elements are secured to the tongue of a vehicle to be towed, and assuming that the coupler is attached to a prospective towing vehicle, the uncoupled position is illustrated in FIGURES 1 and 5. The towed vehicle hitch is in the erect position and has a portion 17 of the hitch resting upon the ground thus acting as a stand for the tongue of the vehicle. The towing vehicle approaches the hitch by causing the coupler to pass around the hitch bar 10. To facilitate the guiding of the hitch bar 10 into the notch 58, a pair of detachable sweeps 80 (FIG. 9) may be secured to the guiding edges of the coupler. The sweeps effectively increase the size of the V thus enabling the coupler to be backed more quickly with greater assurance of securing the hitch bar 10 in the notch 58. As the hitch bar 10 engages the camming surface 62 of the coupler latch plate 54, the latter pivots clockwise as viewed in the drawings about the pivot pin 55. The latch plate is subsequently locked in position by the latch and release member 63. As the towing vehicle is pulled forward, the hitch bar is pivoted clockwise as viewed in the drawings about the hitch pivot 20. As the hitch bar pivots, it slides through the coupler until the hitch bar is forced into a substantially horizontal position. As the horizontal position is reached, the hitch latch 27 will "snap" over the hitch locking pin 37 to insure that the hitch bar will remain in a substantially horizontal position. Further clockwise pivoting about the hitch pivot 20 will be inhibited by the hitch stop 36. The towing vehicle is now properly coupled with the towed vehicle; it may be noted that no latching or unlatching controls or tripping cords have required the operator to leave the towing vehicle.

Figure 2:
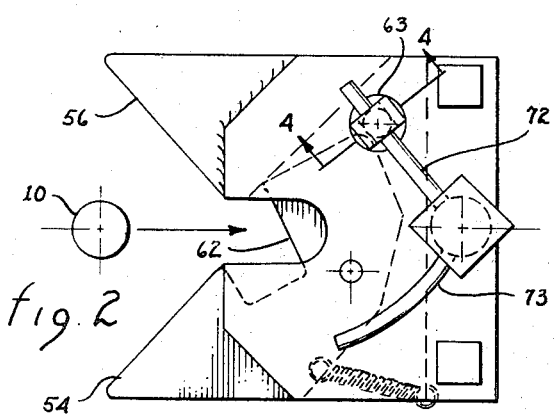
FIG. 2 is a top view of the coupler of the present invention.
Figure 4:
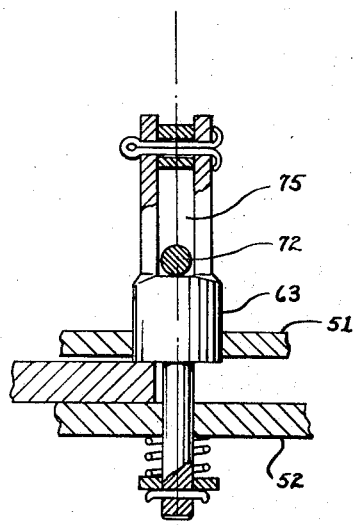
FIG. 4 is a sectional view of FIG. 2 taken along line 4—4.

When it is desired to park the towed vehicle, the tripping cord 77 (already mounted on the towing vehicle) is pulled to cause the sleeve 70 to rise against the force of the biasing spring. The initial motion of the sleeve 70 will cause the hitch trigger 73 to trip the hitch latch release 34. The hitch latch 27 will thus be swung out of engagement with the hitch locking pin 37 to permit the hitch bar 10 to swing in a counterclockwise position as viewed in the drawings. The towing vehicle may then back up causing further pivoting of the hitch bar with the subsequent assumption by the hitch bar 10 of the substantially upright position such as shown in FIGURES 1 and 5. It may be noted that the actuation of the trigger member or sleeve 70 has not affected the coupler since the coupling trigger 72 has merely moved freely in the slot 75 provided in the latch and release member 63. The coupled towing and towed vehicle may thus be parked in this manner with the weight of the towed vehicle on the upright disposed hitch. If complete decoupling is required, further actuation of the trip cord 77 will result in additional travel of the sleeve 70. This additional travel will be translated into the movement of the coupler trigger 72 to the top of the slot 75 in the latch and release member 63. Raising of the latch and release member 63 will cause it to move out of contact with the coupler latch plate 54 permitting the latter to pivot about pivot point 55 in accordance with the force exerted thereon by the biasing springs 60. The coupler will thus assume the position shown in FIGURES 1 and 2 and permit the towing vehicle to proceed completely decoupled from the towed vehicle.

It may be seen that the hitching system of the present invention has permitted an operator to completely control the coupling, parking, and decoupling of a towed-towing vehicle combination. The operator is never required to leave the towing vehicle to connect or disconnect control cords, levers, or other latching or triggering apparatus. The trigger member, in the embodiment chosen for illustration, is shown mounted on the coupler and thus indirectly on the towing vehicle; however, it will be apparent to those skilled in the art that the trigger member may actually be mounted directly on the towing vehicle in sufficient proximity to permit the coupler trigger and hitch trigger to engage the appropriate latch releasing mechanisms of the hitch and coupler. The present invention has been described in terms of a specific embodiment; therefore, it will be apparent to those skilled in the art that the present invention may be modified without departing from the spirit and scope of the invention as defined in the appended claims.

I claim:
1. A hitching system comprising; a hitch bar pivotably attachable to a vehicle to be towed, said hitch bar having an upright position for parking and a generally horizontal position for towing; a hitch latching means for locking said hitch bar in said horizontal position; a hitch latch release mounted for pivotal movement with said hitch bar; a coupler attachable to a towing vehicle, said coupler including a pivotally mounted coupler latch plate having a non-towing position and a towing position for coupling said hitch bar; a coupler latch and release member for locking said coupler latch plate in said towing position; a trigger member mounted on said towing vehicle and having a coupler trigger and a hitch trigger for engaging said coupler latch and release member and said hitch latch release respectively; said trigger member, when actuated, tripping said hitch latch release to permit said hitch bar to pivot and tripping said coupler latch and release member to permit said coupler latch plate to pivot, said trigger member has two positions the first of which trips said hitch release and the second of which trips said coupler latch and release member.

2. The combination set forth in claim 1 wherein said pivotally mounted coupler latch plate is mounted for movement in a horizontal plane.

3. The combination set forth in claim 1 wherein said trigger member is mounted on said coupler.

4. The combination set forth in claim 1 wherein said trigger member, when actuated, sequentially trips said hitch latch release to permit said hitch bar to pivot and trips said coupler latch and release member to permit said coupler latch plate to pivot.

References Cited
UNITED STATES PATENTS

| | | | |
|---|---|---|---|
| 1,649,980 | 11/1927 | Schlagenhauf | 280—508 |
| 2,635,890 | 4/1953 | Schwartz | 280—508 |
| 2,705,649 | 4/1955 | Collier | 280—504 |
| 2,937,887 | 5/1960 | Richman | 280—508 |
| 3,161,422 | 12/1964 | Wade | 280—508 |

BENJAMIN HERSH, *Primary Examiner.*

JOEL E. SIEGEL, *Assistant Examiner.*